US009046990B2

(12) United States Patent
Fujioka

(10) Patent No.: US 9,046,990 B2
(45) Date of Patent: Jun. 2, 2015

(54) MANUAL BROWSING DEVICE, INFORMATION PROCESSING SYSTEM, AND COMPUTER READABLE MEDIUM

(71) Applicant: PFU Limited, Kahoku-shi, Ishikawa (JP)

(72) Inventor: Ichiro Fujioka, Ishikawa (JP)

(73) Assignee: PFU Limited, Ishikawa (JP)

( * ) Notice: Subject to any disclaimer, the term of this patent is extended or adjusted under 35 U.S.C. 154(b) by 176 days.

(21) Appl. No.: 13/870,697

(22) Filed: Apr. 25, 2013

(65) Prior Publication Data

US 2014/0033033 A1 Jan. 30, 2014

(30) Foreign Application Priority Data

Jul. 30, 2012 (JP) ................................ 2012-168906

(51) Int. Cl.

*G06F 3/0481* (2013.01)
*G06F 3/0482* (2013.01)
*G06F 9/44* (2006.01)

(52) U.S. Cl.

CPC ............ *G06F 3/0482* (2013.01); *G06F 9/4446* (2013.01)

(58) Field of Classification Search

CPC combination set(s) only.
See application file for complete search history.

(56) References Cited

U.S. PATENT DOCUMENTS

| | | | | |
|---|---|---|---|---|
| 6,308,205 | B1 * | 10/2001 | Carcerano et al. | 709/221 |
| 6,831,757 | B1 * | 12/2004 | Terao | 358/400 |
| 7,836,035 | B2 * | 11/2010 | Imago | 707/705 |
| 8,654,929 | B2 * | 2/2014 | Cassanova | 379/1.01 |
| 2003/0018742 | A1 * | 1/2003 | Imago | 709/214 |
| 2005/0146535 | A1 * | 7/2005 | Shin | 345/619 |
| 2008/0306961 | A1 * | 12/2008 | Pineau et al. | 707/10 |
| 2009/0326943 | A1 * | 12/2009 | Abe | 704/246 |
| 2010/0023891 | A1 * | 1/2010 | Seo | 715/828 |
| 2010/0211607 | A1 * | 8/2010 | Naito | 707/802 |
| 2010/0304787 | A1 * | 12/2010 | Lee et al. | 455/556.1 |

FOREIGN PATENT DOCUMENTS

| | | |
|---|---|---|
| JP | 11-316636 A | 11/1999 |
| JP | 2002-182811 A | 6/2002 |

* cited by examiner

*Primary Examiner* — Phenuel Salomon
(74) *Attorney, Agent, or Firm* — McDermott Will & Emery LLP

(57) ABSTRACT

There is provided a manual browsing device comprising: a manual storage section that stores manual information; a collection section that collects device information of the manual browsing device or device information of a peripheral, which is an external device communicating information with the manual browsing device; an information selection section that selects a display menu which indicates some of the manual information based on the device information collected by the collection section; and an updating section that updates a display screen on which the manual information is displayed, by using the display menu selected by the information selection section.

6 Claims, 22 Drawing Sheets

FIG. 3

Structures of manual data, FAQ data, and customer management information

<<Manual data>>

FAQ menu 114

| Title | Text file (instructions for use) | Selection factor |
|---|---|---|
| How to install software | Procedure 1: Download ◯◯◯ and △△△ updates to hard disk.<br>Procedure 2: End all active applications and execute ◯◯◯ downloaded according to procedure 1. | Device history information |
| How to use quick menu | Right-click on the icon of xxx displayed on a task bar and left-click on "Use quick menu" on a displayed menu. | Application operation history information |

FAQ menu 114

⋮

<<FAQ data>>

FAQ menu 114

| Title | Contents of question | Contents of answer | Selection factor |
|---|---|---|---|
| What is the type of a manuscript that can be read? | Can a card-size manuscript be read? | Card sizes through A4 sizes can be read to automatically detect manuscripts having various sizes and read optimal images that match the manuscript sizes. | Device history information |
| How to create a PDF that can be searched for by using keyword | What should be done in order to search for a specific keyword contained in the PDF? | Click on "SEARCH" on a "FILE" tool bar and enter a phrase to be searched for in a text box. | Device history information |

FAQ menu 114

⋮

<<Customer management information>>

FAQ menu 114

| Contents of question | Call volume | Contents of answer | Helpful answer volume | Weighting title |
|---|---|---|---|---|
| Can a card-size manuscript be read? | 30 | Card sizes through A4 sizes can be read to automatically detect manuscripts having various sizes and read optimal images that match the manuscript sizes. | 25 | What is the type of a manuscript that can be read? |
| What should be done in order to search for a specific keyword contained in the PDF? | 15 | Click on "SEARCH" on a "FILE" tool bar and enter a phrase to be searched for in a text box. | 15 | How to create a PDF that can be searched for by using keyword |

⋮

FAQ menu 114

Manual display screen 11

FIG. 7

Example of FAQ menu 114 selected based on keyword (A) Example of application operation history and device history/ error log information

| Keyword | Device information related to keyword |
|---|---|
| OS | Windows |
| Language | Japanese |
| Application's type and use status (application/paper size/resolution/color/ number of sheets) | Card filing/business card/300 dpi/color: 150 sheets/day<br>Save in mobile/A5/150 dpi/monochromatic: 100 sheets/day |
| Error message and frequency | Manuscript jamming/mistake in manuscript setting: 10 times/day |

(B) FAQ menu 114 selected based on device information

| Want-to-do menu | Want-to-check menu | Frequently asked questions (Q&A) | Proposal menu |
|---|---|---|---|
| •Want to read/register business cards only by pressing a button.<br>•Want to link with Evernote. | •What should be done in order to improve perception of a company name by using a business card?<br>•What is an application with which you can link with a mobile automatically? | •What should be done in order to prevent a manuscript from being jammed?<br>•What is the type of a sheet that can be used? | •Try to link with a cloud! |

FIG. 9A

FAQ menu 114 corresponding to device information

| Title | Menu items |
|---|---|
| To start with | |
| | ■How to read this book |
| Before using ScanSnap | |
| | Features of ScanSnap |
| | Names and functions of components |
| | ■Front surface |
| | ■Rear surface |
| | Operating environment |
| | ■Windows |
| | ■Mac OS |
| | Power ON/OFF |
| | Manuscript that can be read |
| | ■Conditions of manuscript that can be read |

⋮

| | |
|---|---|
| | ■Automatic linkage of application |
| | ■Notification of communication state of ScanSnap 114 |
| | ■Screen display during manuscript reading |
| | Office functions |
| | ■Save in specified folder |
| | ■Add to mail |
| | ■Use ScanSnap in place of copy machine |
| | ■Register business card information in CardMinder |
| | ■Register in iPhoto |
| | ■Save typed manuscript in Evernote |
| | ■Save in Google document |
| | ■Save manuscript containing handwritten characters in Evernote |
| | ■Post to SalesForce Chatter |
| | ■Save in SugerSync synchronous folder |
| | ■Save in mobile device |

Corresponding to application operation history information

FIG. 9B

| | | |
|---|---|---|
| | Various methods for using ScanSnap | |
| | | ■Read only single side |
| | | ■Read color manuscript in gray or black and white |
| | | ■Delete black-and-white pages from image data |
| | | ■Correct tilting of character strings |
| | | ■Correct the direction of a manuscript read in various directions |
| | | ■Simultaneously read manuscripts having different widths and lengths |
| | | ■Read manuscripts having a size larger than A4 size |
| | | ■Read manuscripts such as photos and scraps |
| | | ■Reads long manuscripts |
| | | ■Divide and save in a plurality of PDF files |
| | | ■Create a PDF file that can be searched for |
| | | ■Automatically set a keyword to the PDF file |
| | What to do in trouble | |
| | Read the manuscript | |
| | | Manuscript reading not started |
| | | Manuscript not sent properly/manuscript jammed |
| | | Manuscript reading takes too much of time |
| | | Multiple manuscripts sent at a time (multi-fields are detected) |
| | | A quick menu is not displayed |

Corresponding to device history information

Corresponding to error log information 1

⋮

| | | |
|---|---|---|
| | Settings of ScanSnap Manager | |
| | | The manuscript is tainted |
| | | "Reading setting" reading conditions cannot be changed |
| | | A file size cannot be set |
| | | An application cannot be set on a ScanSnap setting screen |
| | | A left-click menu is not displayed |
| | A3 carrier sheet | |
| | | The A3 carrier sheet is not sent properly/A3 carrier sheet is jammed |
| | | Image data is lacking |
| | Creation of image data | |
| | | Blank-sheet image data is created |

Corresponding to error log information 2

| Extraction conditions | Contents of FAQ menu extraction conditions |
|---|---|
| 1 | Select in priority order of FAQ menus 114 (application operation history information) |
| 2 | Select in priority order of FAQ menus 114 (device history information) |
| 3 | Select in priority order of FAQ menus 114 (error log information 1) |
| 4 | Select in priority order of FAQ menus 114 (error log information 2) |
| 5 | Select according to a frequency at which application is operated |
| 6 | Select according to frequency at which device is operated |
| 7 | Select according to frequency at which device error occurs |
| 8 | Select according to frequency at which device error occurs |
| 9 | Select according to weighting by use of call volume |

FIG. 11A

Example of FAQ menu 114 selected when manual data is new or updated (A) FAQ menus 114 corresponding to application operation history information

| | | Extract from the top sequentially for each manual data item | | | |
|---|---|---|---|---|---|
| | Menu items: Described in priority order | Want-to-do | Want-to-check | Frequently asked questions | Proposals |
| Office functions | ■Save in specified folder | ○ | ○ | ○ | ○ |
| | ■Add to mail | ○ | ○ | | ○ |
| | ■Use ScanSnap in place of copy machine | | | | |
| | ■Register business card information in CardMinder | | | | |
| | ■Register in iPhoto | | | | |
| | ■Save typed manuscript in Evernote | | | | |
| | ■Save in Google document | | | | |
| | ■Save manuscript containing handwritten characters in Evernote | | | | |
| | ■Post to SalesForce Chatter | | | | |
| | ■Save in SugerSync synchronous folder | | | | |
| | ■Save in mobile device | | | | |
| Extraction condition 1 | | Top two cases | Top two cases | One high-priority case | Top two cases |

Select FAQ menus 114 having high priority according to the extraction condition 1

(B) FAQ menus 114 corresponding to device history information

| | | Extract from the top sequentially for each manual data item | | | |
|---|---|---|---|---|---|
| | Menu items: Described in priority order | Want-to-do | Want-to-check | Frequently asked questions | Proposals |
| Various methods for use | ■Read only single side | ○ | ○ | ○ | ○ |
| | ■Read color manuscript in gray or black and white | ○ | ○ | | ○ |
| | ■Delete black-and-white pages from image data | | | | |
| | ■Correct tilting of character strings | | | | |
| | ■Correct the direction of a manuscript read in various directions | | | | |
| | ■Simultaneously read manuscripts having different widths and lengths | | | | |
| | ■Read manuscripts having a size larger than A4 size | | | | |
| | ■Read manuscripts such as photos and scraps | | | | |
| | ■Reads long manuscripts | | | | |
| | ■Divide and save in a plurality of PDF files | | | | |
| | ■Create a PDF file that can be searched for | | | | |
| | ■Automatically set a keyword to the PDF file | | | | |
| Extraction condition 2 | | Top two cases | Top two cases | One high-priority case | Top two cases |

Select FAQ menus 114 having high priority according to the extraction condition 2

FIG. 11B (C) FAQ menus 114 corresponding to error log information 1

| | | Extract from the top sequentially for each manual data item | | | |
|---|---|---|---|---|---|
| | Menu items: Described in priority order | Want-to-do | Want-to-check | Frequently asked questions | Proposals |
| Manuscript reading | Manuscript reading not started | | | O | |
| | Manuscript not sent properly/manuscript jammed | | | | |
| | Manuscript reading takes too much of time | | | | |
| | Multiple manuscripts sent at a time (multi-fields are detected) | | | | |
| How to use Manager | | | | | |
| | "Reading setting" reading conditions cannot be changed | | | | |
| | A file size cannot be set | | | | |
| Extraction condition 3 | | Not subject | Not subject | One high-priority case | Not subject |

Select FAQ menus 114 having high priority according to the extraction condition 3

(D) FAQ menus 114 corresponding to error log information 2

| | | Extract from the top sequentially for each manual data item | | | |
|---|---|---|---|---|---|
| A3 carrier sheet | Menu items: Described in priority order | Want-to-do | Want-to-check | Frequently asked questions | Proposals |
| | The A3 carrier sheet is not sent properly | | | O | |
| | Image data is lacking (A3 carrier sheet) | | | | |
| Creation of image data | Menu items: Described in priority order | | | | |
| | Blank-sheet image data is created | | | | |
| | Vertical lines (in red, blue, yellow, green, white, etc.) that cannot be contained in a manuscript enter image data | | | | |
| | Image data is tilted | | | | |
| Extraction condition 4 | | Not subject | Not subject | One high-priority case | Not subject |

Select FAQ menus 114 having high priority according to the extraction condition 4

FIG. 12

Example of FAQ menu 114 selected before weighting (in offline status)

Example of FAQ menu 114 selected based on application operation history information ◎: Frequent ○: Occasional △: In history –: Not in history

| | Read application history | | Extract from the top sequentially for each manual data based on the number of times of using | | | |
|---|---|---|---|---|---|---|
| Menu items: Described in priority order | Use quick menu | Number of times/day | Want-to-do | Want-to-check | Frequency asked questions | Proposals |
| ■Save in specified folder | ◎ | 100 | ○ | | ○ | |
| ■Add to mail | ○ | 8 | | ○ | | |
| ■Use ScanSnap in place of copy machine | ○ | 15 | | ○ | | |
| ■Register business card information in CardMinder | ◎ | 50 | ○ | | ○ | |
| ■Register in iPhoto | ○ | 16 | ○ | | ○ | |
| ■Save typed manuscript in Evernote | – | – | | | | ○ |
| ■Save in Google document | – | – | | | | ○ |
| ■Save manuscript containing handwritten characters in Evernote | – | – | | | | ○ |
| ■Post to SalesForce Chatter | – | – | | | | ○ |
| ■Save in SugerSync synchronous folder | – | – | | | | ○ |
| ■Save in mobile device | ○ | 10 | | ○ | | |
| Extraction condition 5A | – | | Top three cases in descending order of number of times | top three cases in ascending order of number of times | Top three cases in descending order of number of times | Number of times is all 0 |
| Extraction condition 5B | – | | Top two cases of the above | Top two cases of the above | Top one cases of the above | Top two cases of the above |

FAQ menu 114 that satisfies extraction condition 5A

FAQ menus 114 satisfying extraction condition 5B among those marked with ○

* After FAQ menus 114 are selected using the extraction condition 5A, the extraction condition 5B is used to further narrow down the FAQ menus 114

[shaded ○] : Results of selection

FIG. 13

Example of FAQ menu 114 selected based on device history information

Example of FAQ menu 114 selected based on device history information

◎: Frequent ○: Occasional △: In history –: Not in history

| | Function use history | | Extract from the top sequentially for each manual data based on the number of times of using | | | |
|---|---|---|---|---|---|---|
| Menu items: Described in priority order | Settings changed | Number of times/day | Want-to-do | Want-to-check | Frequency asked questions | Proposals |
| ■Read only single side | △ | 80 | ○ | | ○ | |
| ■Read color manuscript in gray or black and white | – | – | | | | ○ |
| ■Delete black-and-white pages from image data | – | – | | | | ○ |
| ■Correct tilting of character strings | – | – | | | | ○ |
| ■Correct the direction of a manuscript read in various directions | ○ | 23 | ○ | ○ | ○ | |
| ■Simultaneously read manuscripts having different widths and lengths | – | – | | | | ○ |
| ■Read manuscripts having a size larger than A4 size | △ | 3 | | ○ | | |
| ■Read manuscripts such as photos and scraps | – | – | | | | ○ |
| ■Reads long manuscripts | ◎ | 60 | ○ | ○ | ○ | |
| ■Divide and save in a plurality of PDF files | – | – | | | | ○ |
| ■Create a PDF file that can be searched for | – | – | | | | ○ |
| ■Automatically set a keyword to the PDF file | – | – | | | | ○ |
| Extraction condition 6A | – | | Top three cases in descending order of number of times | top three cases in ascending order of number of times | Top three cases in descending order of number of times | Top three cases in descending order of number of times |
| Extraction condition 6B | – | | Top two cases of the above | Top two cases of the above | Top two cases of the above | Top one cases of the above |

FAQ menu 114 that satisfies extraction condition 6A

FAQ menus 114 satisfying extraction condition 6B among those marked with ○

* After FAQ menus 114 are selected using the extraction condition 6A, the extraction condition 6B is used to further narrow down the FAQ menus 114

(shaded) ○ : Results of selection

FIG. 14

Example of FAQ menu 114 selected based on device history information

Example of FAQ menu 114 selected based on error log information 1

◎: Frequent ○: Occasional △: In history –: Not in history

| | Error history | | Extract from the top sequentially for each manual data based on the number of times of using | | | |
|---|---|---|---|---|---|---|
| Menu items: Described in priority order | Device occurrence history | Number of times/day | Want-to-do | Want-to-check | Frequency asked questions | Proposals |
| Manuscript reading not started | – | – | | | | |
| Manuscript not sent properly/manuscript jammed | ◎ | 50 | | | ○ | |
| Manuscript reading takes too much of time | – | – | | | | |
| Multiple manuscripts sent at a time (multi-fields are detected) | ◎ | 25 | | | ○ | |
| | – | – | | | | |
| "Reading setting" reading conditions cannot be changed | – | – | | | | |
| A file size cannot be set | – | – | | | | |
| Extraction condition 7A | – | | Not subject | Not subject | Number of times not being 0 | Not subject |
| Extraction condition 7A | – | | – | – | Top one cases of the above | – |

* After FAQ menus 114 are selected using the extraction condition 7A, the extraction condition 7B is used to further narrow down the FAQ menus 114

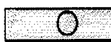
: Results of selection

FIG. 15

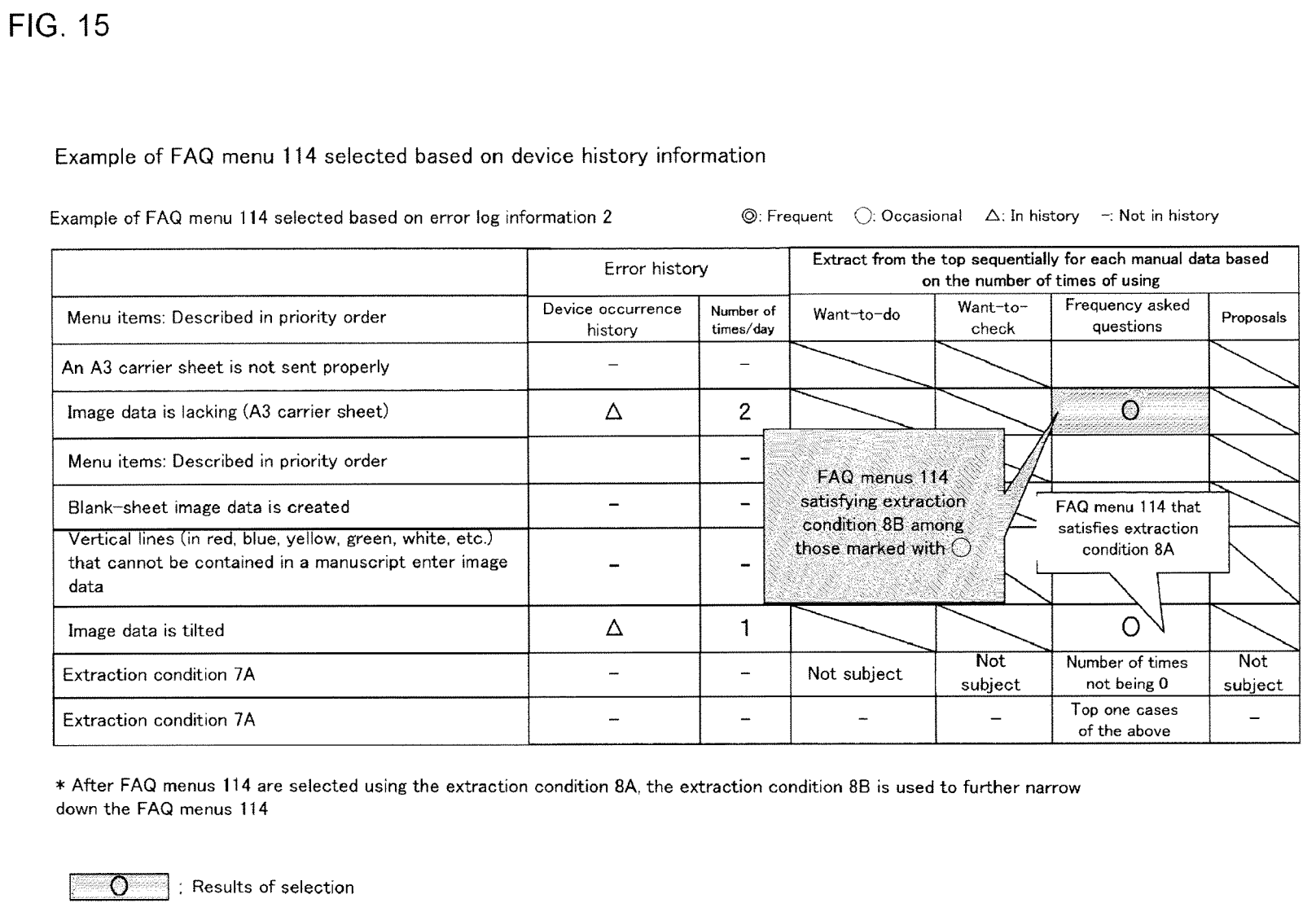

Example of FAQ menu 114 selected based on device history information

Example of FAQ menu 114 selected based on error log information 2

◎: Frequent ○: Occasional △: In history −: Not in history

| | Error history | | Extract from the top sequentially for each manual data based on the number of times of using | | | |
|---|---|---|---|---|---|---|
| Menu items: Described in priority order | Device occurrence history | Number of times/day | Want-to-do | Want-to-check | Frequency asked questions | Proposals |
| An A3 carrier sheet is not sent properly | − | − | | | | |
| Image data is lacking (A3 carrier sheet) | △ | 2 | | | ○ | |
| Menu items: Described in priority order | | − | | | | |
| Blank-sheet image data is created | − | − | | | | |
| Vertical lines (in red, blue, yellow, green, white, etc.) that cannot be contained in a manuscript enter image data | − | − | | | | |
| Image data is tilted | △ | 1 | | | ○ | |
| Extraction condition 7A | − | − | Not subject | Not subject | Number of times not being 0 | Not subject |
| Extraction condition 7A | − | − | − | − | Top one cases of the above | − |

* After FAQ menus 114 are selected using the extraction condition 8A, the extraction condition 8B is used to further narrow down the FAQ menus 114

○ : Results of selection

FIG. 16A

Example of FAQ menu 114 selected after weighting

Example of FAQ menu 114 selected based on application operation history information and call information

| | Call information | | | Extracting FAQ 114 again based on call information | | | |
|---|---|---|---|---|---|---|---|
| Menu items: Described in priority order | Call volume | Helpful answer | Call total | Want-to-do | Want-to-check | Frequency asked questions | Proposals |
| ■Save in specified folder | 23 | 5 | 28 | ○ | | ○ | |
| ■Add to mail | 32 | 0 | 32 | | ○ | | |
| ■Use ScanSnap in place of copy machine | 13 | 25 | 38 | | ○ | | |
| ■Register business card information in CardMinder | 35 | 2 | 37 | ○ | | ○ | |
| ■Register in iPhoto | 7 | 0 | 7 | ○ | | ○ | ○ |
| ■Save typed manuscript in Evernote | 24 | 0 | 24 | | | | ○ |
| ■Save in Google document | 0 | 4 | 4 | | | | ○ |
| **■Save manuscript containing handwritten characters in Evernote** | 0 | 0 | 0 | | | | ○ |
| ■Post to SalesForce Chatter | 10 | 58 | 68 | | | | ○ |
| ■Save in SugerSync synchronous folder | 0 | 0 | 0 | | | | ○ |
| ■Save in mobile device | 32 | 2 | 34 | | ○ | | |

Rejected due to weighting

Extracting FAQ 114 again based on call information

| | Call information | | | Extracting FAQ 114 again based on call information | | | |
|---|---|---|---|---|---|---|---|
| Menu items: Described in priority order | Call volume | Helpful answer | Call total | Want-to-do | check | questions | Proposals |
| ■Read only single side | 5 | 1 | 6 | ○ | | ○ | |
| ■Read color manuscript in gray or black and white | 5 | 4 | 9 | | | | ○ |
| ■Delete black-and-white pages from image data | 49 | 6 | 55 | | | | ○ |
| ■Correct tilting of character strings | 33 | 1 | 34 | | | | ○ |
| ■Correct the direction of a manuscript read in various directions | 23 | 0 | 23 | ○ | ○ | ○ | |
| ■Simultaneously read manuscripts having different widths and lengths | 0 | 0 | 0 | | | | ○ |
| ■Read manuscripts having a size larger than A4 size | 10 | 3 | 13 | | ○ | | |
| ■Read manuscripts such as photos and scraps | 14 | 5 | 19 | | | | ○ |
| ■Reads long manuscripts | 32 | 1 | 33 | ○ | ○ | ○ | |
| ■Divide and save in a plurality of PDF files | 0 | 1 | 1 | | | | ○ |
| ■Create a PDF file that can be searched for | 0 | 0 | 0 | | | | ○ |
| ■Automatically set a keyword to the PDF file | 3 | 0 | 3 | | | | ○ |

Rejected due to weighting

Elected due to weighting

Example of FAQ menu 114 selected based on error log information 1 and call information

| | Call information | | | Extracting FAQ 114 again based on call information | | | |
|---|---|---|---|---|---|---|---|
| Menu items: Described in priority order | Call volume | Helpful answer | Call total | Want-to-do | check | questions | Proposals |
| Manuscript reading not started | 40 | 38 | 78 | | | | |
| Manuscript not sent properly/manuscript jammed | 35 | 12 | 47 | | | ○ | |
| Manuscript reading takes too much of time | 55 | 4 | 59 | | | | |
| Multiple manuscripts sent at a time (multi-fields are detected) | 20 | 67 | 87 | | | ○ | |
| | 11 | 53 | 64 | | | | |
| "Reading setting" reading conditions cannot be changed | 6 | 2 | 8 | | | | |
| A file size cannot be set | 0 | 4 | 4 | | | | |

Elected due to weighting

FIG. 16B

Example of FAQ menu 114 selected based on error log information 2 and call information

| | Call information | | | Extracting FAQ 114 again based on call information | | | |
|---|---|---|---|---|---|---|---|
| Menu items: Described in priority order | Call volume | Helpful answer | Call total | Want-to-do | Want-to-check | Frequency asked questions | Proposals |
| An A3 carrier sheet is not sent properly | 13 | 2 | 15 | | | | |
| Image data is lacking (A3 carrier sheet) | 42 | 3 | 45 | | | ○ | |
| Menu items: Described in priority order | 5 | 6 | 11 | | | | |
| Blank-sheet image data is created | 17 | 0 | 17 | | | | |
| Vertical lines (in red, blue, yellow, green, white, etc.) that cannot be contained in a manuscript enter image data | 4 | 0 | 4 | | | | |
| Image data is tilted | 2 | 0 | 2 | | | ○ | |

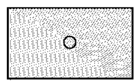

: Results of selection

Extraction condition 9: Top four cases are selected in descending order of the call total Manual data updating processing (S10)

Front page updating processing (S20)

Manual updating processing by manual management device 7 in online status (S30)

MANUAL BROWSING DEVICE, INFORMATION PROCESSING SYSTEM, AND COMPUTER READABLE MEDIUM

CROSS-REFERENCE TO RELATED APPLICATIONS

This application is based on and claims priority under 35 USC 119 from Japanese Patent Application No. 2012-168906 filed Jul. 30, 2012.

FIELD

The present invention relates to an information processing system, a manual browsing device, and a computer readable medium.

BACKGROUND

Japanese Patent Application Laid-Open (JP-A) No. 2002-182811 discloses a software support system for displaying a plurality of window screens on the display of a computer and performing respective processes in those window screens. The software support system includes ID acquisition means that acquires an ID unique to the window screen being worked currently from among the unique IDs issued to the window screens, a user support database that accumulates support information about the window screens in condition where they are correlated with the IDs unique to the window screens, search means that searches the user support database based on the ID which is unique to the window screen being worked currently and acquired by the ID acquisition means, and output means that outputs the support information searched for.

Japanese Patent Application Laid-Open (JP-A) No. 11-316636 discloses a manual display device including recording medium reading means that can read manual information of a guidance manual and an operational manual respectively from an attachable/detachable recording medium recording those manuals, guidance manual display means that reads the guidance manual by using the recording medium reading means and displays it, operational manual storage means that reads the operational manual by using the recording medium reading means and stores it, updated information acquisition means that acquires updated information of the operational manual via a network, and operational manual display means that can read the operational manual from the operational manual storage means and display it and acquire the updated information of this operational manual by using the updated information acquisition means and display it.

SUMMARY

According to an aspect of the invention, there is provided a manual browsing device comprising: a manual storage section that stores manual information; a collection section that collects device information of the manual browsing device or device information of a peripheral, which is an external device communicating information with the manual browsing device; an information selection section that selects a display menu which indicates some of the manual information based on the device information collected by the collection section; and an updating section that updates a display screen on which the manual information is displayed, by using the display menu selected by the information selection section.

According to another aspect of the invention, there is provided an information processing system comprising: a manual browsing device; and a manual management device, wherein the manual browsing device has a manual storage section which stores manual information, a collection section which collects device information of the manual browsing device or device information of a peripheral which is an external device communicating information with the manual browsing device, and an updating section which updates a display screen on which the manual information is displayed, the manual management device has an information selection section which selects a display menu indicating some of the manual information based on the device information collected by the collection section, and the updating section updates the display screen by using the display menu selected by the information selection section.

According to another aspect of the invention, there is provided a non-transitory computer-readable medium storing thereon a computer program that causes a computer to perform a method comprising: collecting device information of a manual browsing device or device information of a peripheral, which is an external device communicating information with the manual browsing device; selecting a display menu which indicates some of the manual information based on the device information collected by the manual browsing device; and updating a display screen on which the manual information is displayed by using the display menu selected by the manual browsing device.

BRIEF DESCRIPTION OF DRAWINGS

Exemplary embodiments of the present invention will be described in detail based on the following figures.

FIG. 3 is an explanatory table of structures of manual data, FAQ data, and customer management information;

FIG. 7 is an example of an FAQ menu 114 selected based on keywords;

FIGS. 9A and 9B are one example of the FAQ menu 114 that corresponds to device information;

FIG. 10 is one example of conditions for extracting the FAQ menu 114;

FIGS. 11A and 11B are an example of selecting the FAQ menu 114 when manual data is new or updated;

FIG. 12 is an example of the FAQ menu 114 selected based on application operation history information;

FIG. 13 is an example of the FAQ menu 114 selected based on device history information;

FIG. 14 is an example of the FAQ menu 114 selected based on error log information 1;

FIG. 15 is an example of the FAQ menu 114 selected based on error log information 2;

FIGS. 16A and 16B are an example of the FAQ menu 114 selected after weighting;

DESCRIPTION OF EMBODIMENT

The following will describe an embodiment of the present invention with reference to the drawings.

Figure 1:
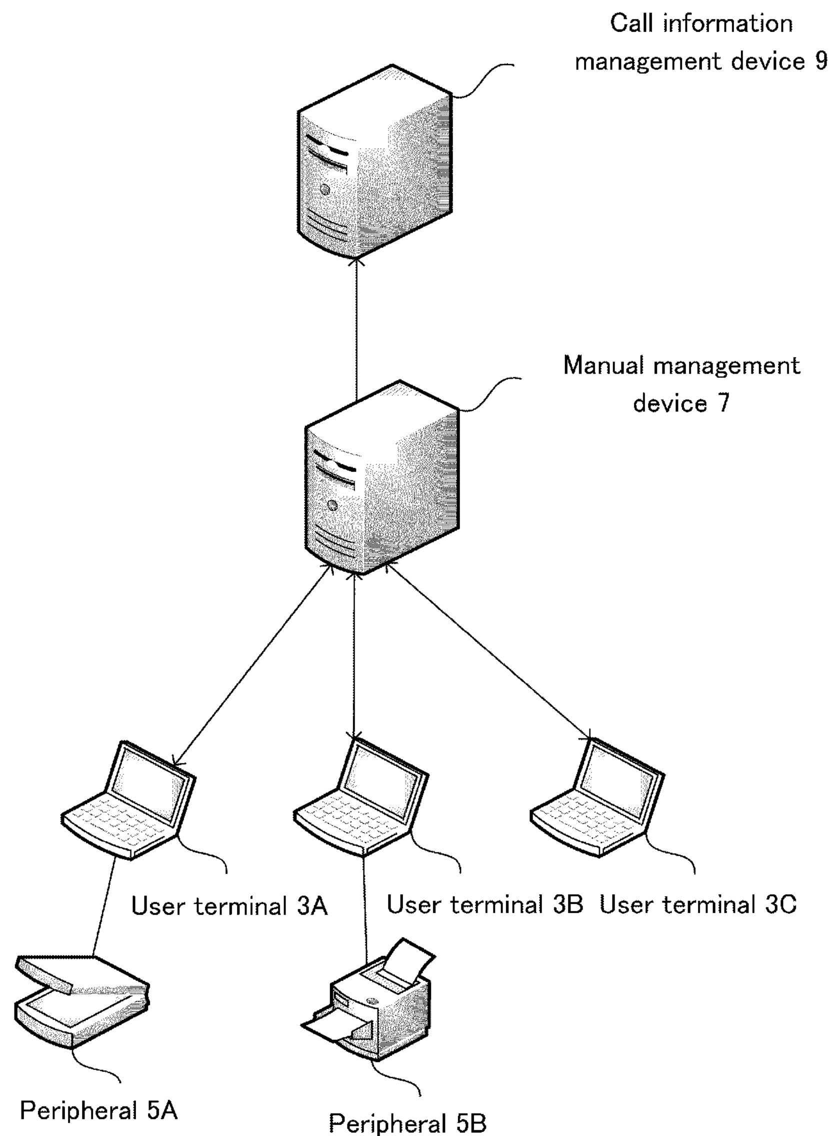
FIG. 1 is an explanatory diagram of an outline of a manual updating system 1.

FIG. 1 is an explanatory diagram of the outline of a manual updating system 1.

Figure 2:
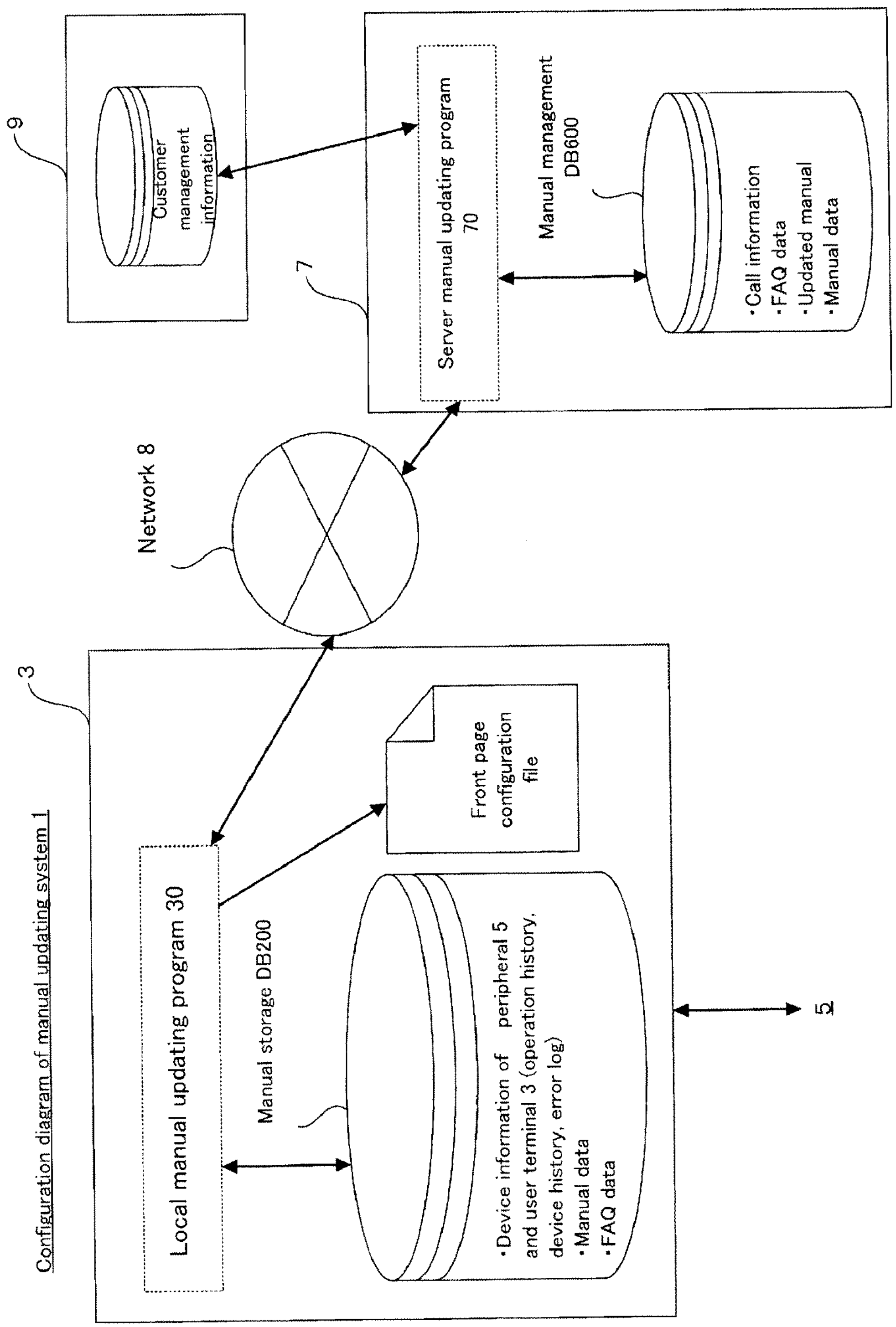
FIG. 2 is an explanatory diagram of a configuration of the manual updating system 1.

FIG. 2 is an explanatory diagram of a configuration of the manual updating system 1.

FIG. 3 is an explanatory table of the structures of manual data, FAQ data, and customer management information.

As illustrated in FIG. 1, the manual updating system 1 of the embodiment has user terminals 3A to 3C, peripherals 5A and 5B, a manual management device 7, and a call information management device 9.

As illustrated in FIGS. 1 and 2, the user terminal 3 is a computer terminal including a central processor, a main storage, an external storage, an input device, and monitor. The user terminal 3 is connected to the manual management device 7 and the peripherals 5 via a network 8 or a connection cable.

The user terminal 3 is one example of a manual browsing device according to the invention and permits a user of the user terminal 3 to browse a manual via a manual display screen 11 (to be described later in FIG. 4) of the user terminal 3. The manual display screen 11 is the front page of a user interface arranged to display manual information. Further, the user terminal 3 selects a user-friendly display menu (FAQ menu 114 to be described later) to be displayed on the manual display screen 11 and updates it to the manual display screen 11 including the selected display menu. "To select the FAQ menu 114", referred to here, means to select it as the candidate of a menu to be displayed on the manual display screen 11. This operation of selection is distinguished from a "selection operation", by which the user selects an indicated display menu (an FAQ menu 114 to be described later). Moreover, the user terminal 3 collects device information, based on which the user-friendly display menu is selected.

As illustrated in FIG. 2, the user terminal 3 has a manual storage database 200 (manual storage DB200). In the manual storage DB200, device information, manual data, and FAQ data are stored. The manual storage DB200 is one example of manual storage means according to the invention.

The device information, referred to here, means device-related information such as an operation history, a device history, and an error log of the user terminal 3 or the peripheral 5 (to be described later) of the user terminal 3. The operation history refers to a history of operations of the user terminal 3 by the user. Specifically, the operation history is a history of operations of application software. For example, the operation history is a history of the operations of linkage software such as a scanner driver or optical character recognition (OCR) software. The device history is information of the inside of a device which is not erroneous. Specifically, the device history is information of the operating system (OS) in hardware or information of settings of the OS or the peripheral 5. An error log is a history of errors occurring on the user terminal 3 or the peripheral 5.

The manual data is computer-readable information which has the same contents as a user's manual of a machine, a tool, or application software. As illustrated in FIG. 3, the manual data contains a text file (instructions for use) and a title of the text file. In the example, this title is the FAQ menu 114. The FAQ menu 114 is one example of a display menu according to the invention. To the FAQ menu 114 in the manual data, selection factors are correlated. Based on the selection factors, the user terminal 3 selects a display menu which is friendly to the user.

Moreover, as illustrated in FIG. 3, the FAQ data contains "frequently asked questions" (contents of the questions) and "information of the corresponding answers" (contents of the answers). The "frequently asked questions" are given a title, which is also the FAQ menu 114 in the example. Further, the manual information according to the invention contains the text file (the instructions for use) contained in the manual data and answer information contained in the FAQ data. To the FAQ menu 114 in the FAQ data, the selection factors are correlated.

The peripheral 5 is an external device connected to the user terminal 3. The peripheral 5 is, for example, a scanner or a printer connected to the user terminal 3 via a network or a cable. The peripheral 5 of the example is a scanner connected to the user terminal 3 via a universal serial bus (USB).

The call information management device 9 is a computer terminal that manages the information of telephone inquiries from the user and has server functions. The inquiry information is related to inquiries from the user about a device or software covered by a manual and has a concept that contains, for example, contents themselves of telephone inquiries, answers to them, identification information to identify them, a frequency of the same inquiries, a frequency of helpful answers, inquiry date and time, attributes (sex, age, area, etc.) of inquirers, and a combination of those. Specifically, the call information management device 9 manages the contents of the inquiries such as how to use the scanner and contents of telephone inquiries by the users about failures on the scanner.

As illustrated in FIG. 3, the information (customer management information) about telephone inquiries by the user contains at least a plurality of different questions from customers. And each of the questions contains contents of the question, a call volume which is the number of times of questioning, an answer to the question, and a helpful answer volume which is the number of times of helpful answering. The information is input to the call information management device 9 by, for example, an operator who has received a telephone call. Further, the contents of the question are given a title, which is also the FAQ menu 114 in the example.

The manual management device 7 is a computer terminal having server functions. The manual management device 7 is one example of a manual management device according to the invention. The manual management device 7 extracts some of inquiries by the customers from the call information management device 9 and, based on the extracted information, selects a display menu (the later-described FAQ menu 114) to be displayed on the manual display screen 11 of the user terminal 3. Further, the manual management device 7 transmits updated manual data to the user terminal 3.

As illustrated in FIG. 2, the manual management device 7 has a manual management database 600 (manual management DB600). In the manual management DB600, call information, FAQ data, manual data, and an updated manual are stored.

The call information is information about telephone inquiries and contains at least, for example, the number of times of calling and the number of times of useful answering which are extracted from the call information management device 9 by the manual management device 7. The call information is one example of inquiry information according to the invention.

The updated manual is an updated portion of newly created manual data or revised manual data. The updated manual is one example of an updated portion according to the invention and held in the manual management DB600.

Figure 4:
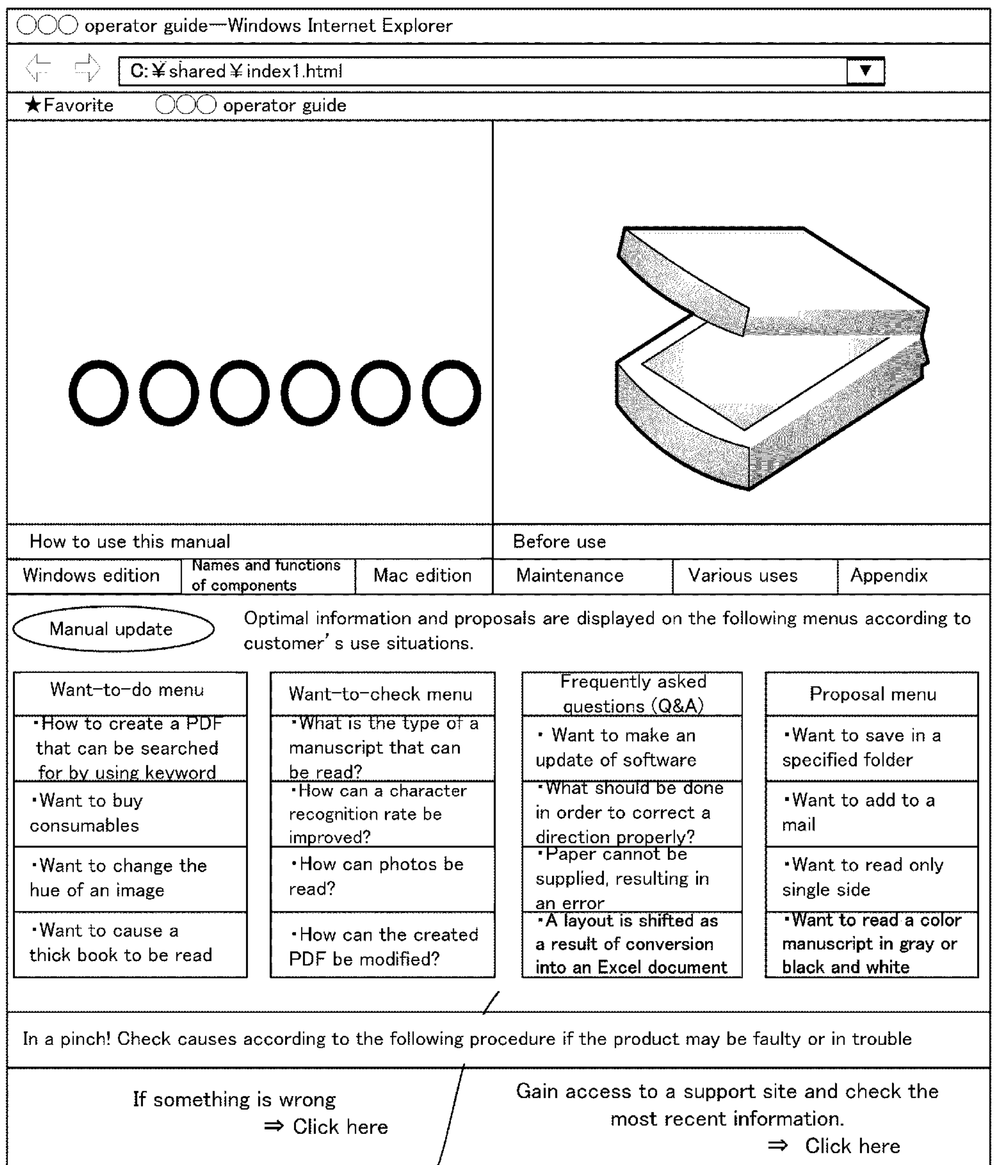
FIG. 4 is a table illustrating a manual display screen 11.

FIG. 4 is a table illustrating the manual display screen 11.

Figure 5:
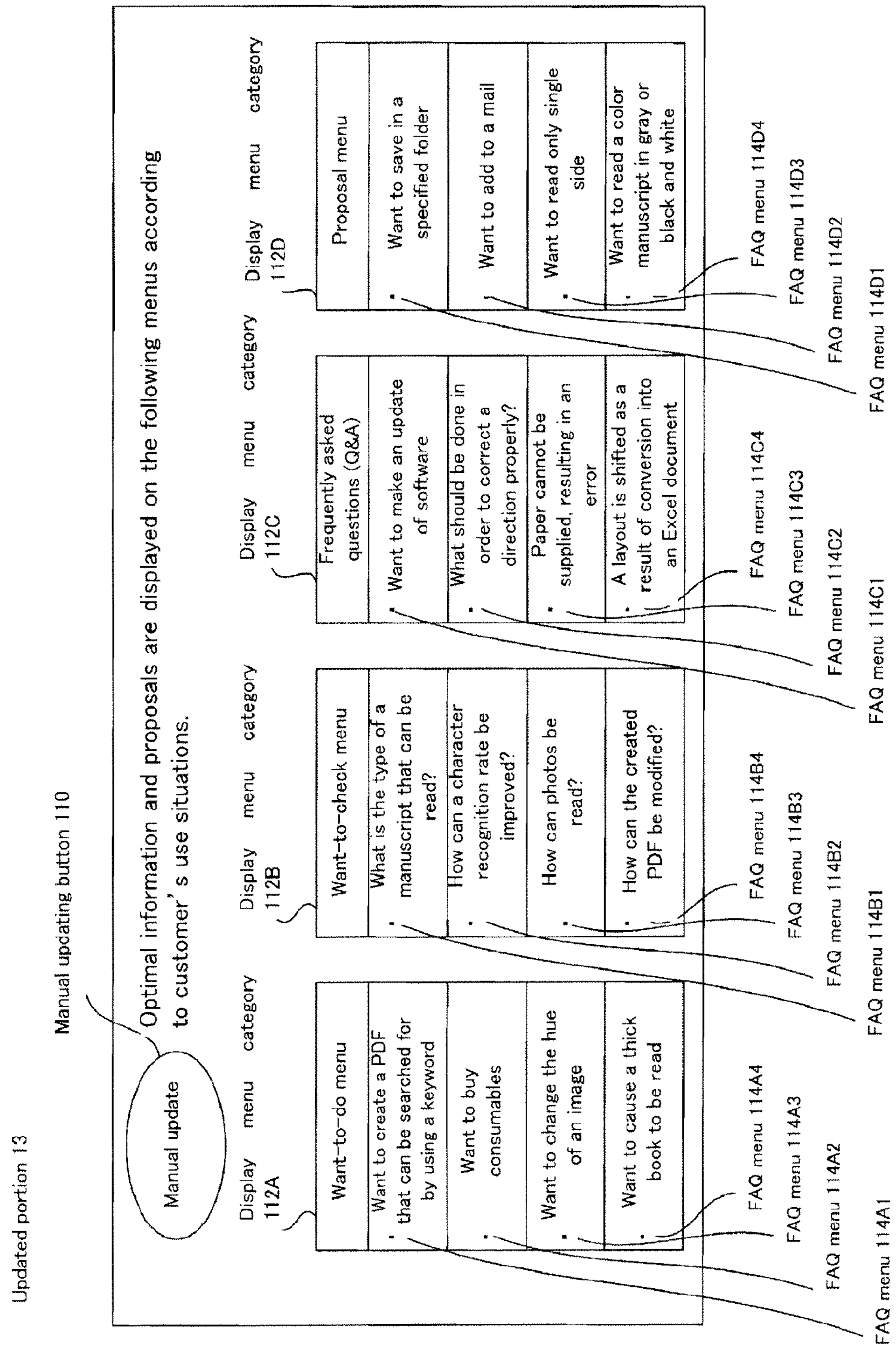
FIG. 5 is a table illustrating an updated portion 13 of the manual display screen 11.

FIG. 5 is a table illustrating an updated portion 13 of the manual display screen 11.

As illustrated in FIG. 4, the manual display screen 11 is one example of a display screen according to the invention. In the example, a file that makes up the manual display screen 11 is set as a front page configuration file, which is held by the user terminal 3. Moreover, the front page configuration file is updated by a local manual updating program 30 (to be described later).

As illustrated in FIG. 5, the manual display screen 11 includes a manual updating button 110, display menu categories 112A to 112D, FAQ menus 114A1 to 114A4, FAQ menus 114B1 to 114B4, FAQ menus 114C1 to 114C4, and FAQ menus 114D1 to 114D4.

The manual updating button 110 triggers start-up of processing to update a user-friendly manual display screen 11. That is, if the user presses the manual updating button 110, the user terminal 3 starts the processing to update the user-friendly manual display screen 11.

The display menu categories 112 are titles of the categorized FAQ menus 114 and, in the example, include a want-to-do menu 112A, a want-to-check menu 112B, a frequently-asked-question (Q&A) 112C, andaproposal menu 112D.

The FAQ menus 114A1 to 114A4 are FAQ menus 114 belonging to the want-to-do menu 112A. The FAQ menus 114B1 to 114B4 are FAQ menus 114 belonging to the want-to-check menu 112B. Further, the FAQ menus 114C1 to 114C4 are FAQ menus 114 belonging to the frequently-asked-question (Q&A) 112C, while the FAQ menus 114D1 to 114D4 are FAQ menus 114 belonging to the proposal menu 112D.

Figure 6:
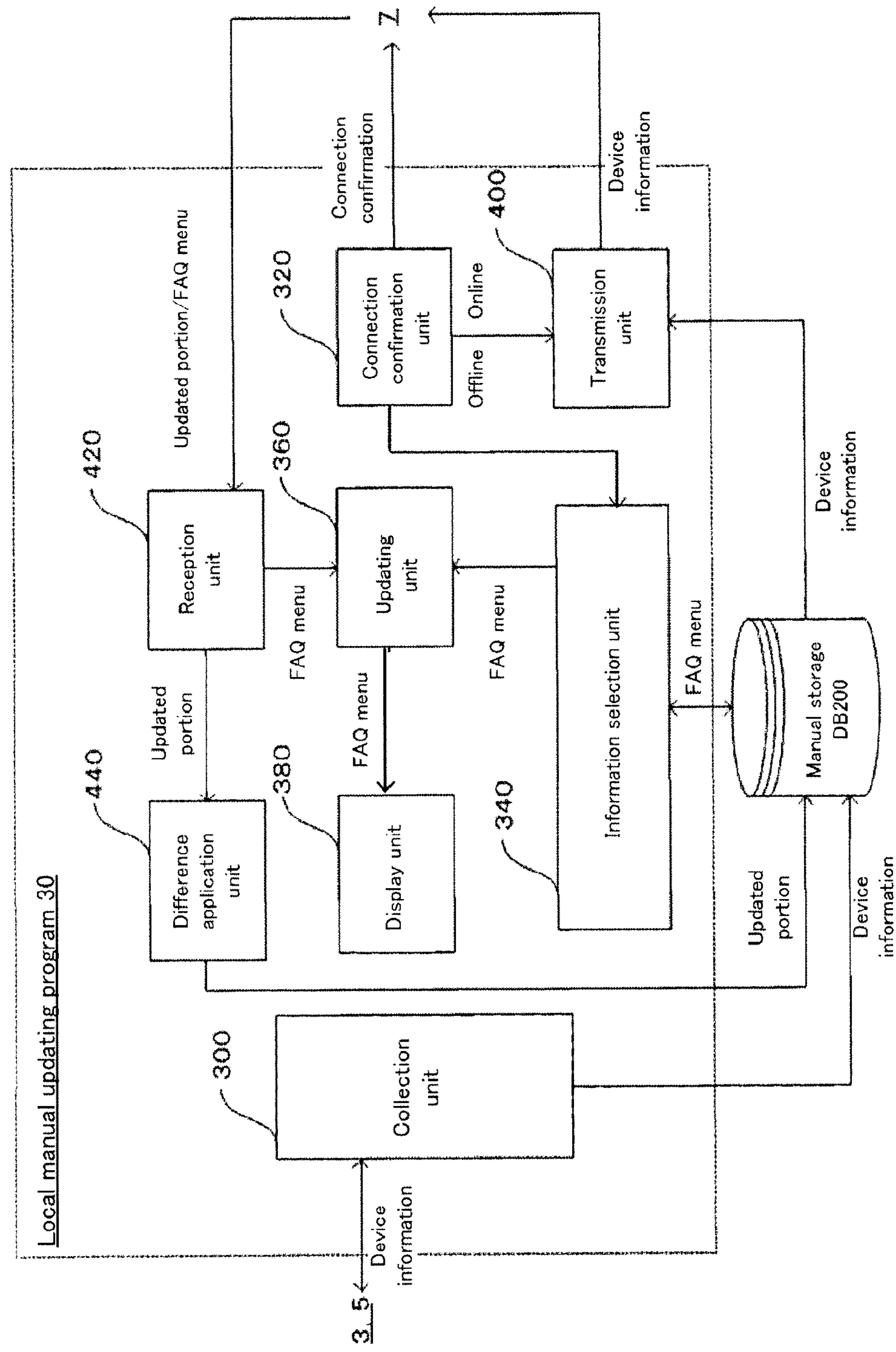
FIG. 6 is an explanatory diagram of a functional configuration of a local manual updating program 30 of the manual updating system 1.

FIG. 6 is an explanatory diagram of a functional configuration of the local manual updating program 30 of the manual updating system 1.

As illustrated in FIG. 6, the local manual updating program 30 has a collection unit 300, a connection confirmation unit 320, an information selection unit 340, an updating unit 360, a displaying unit 380, a transmission unit 400, a reception unit 420, and a difference application unit 440. The local manual updating program 30 is installed to the user terminal 3 via a recording medium such as a CD-ROM, for example.

The collection unit 300 collects device information of the user terminal 3 or device information of the peripheral 5 which communicates information with the user terminal 3.

Specifically, the collection unit 300 collects at least an operation history which is a history of user operations on the user terminal 3, a device history which is information of the inside of a device which is not erroneous and an error log which is a history of errors on the user terminal 3 or an operation history, device history, and error log of the scanner.

In the example, the collection unit 300 functions if the manual updating button 110 on the manual display screen 11 is pressed by the user. The collection unit 300 stores the operation history information, the device history information, and the error log information collected from the user terminal 3 or scanner of the user terminal 3 in the manual storage DB200.

The connection confirmation unit 320 confirms a connection state between the user terminal 3 and the manual management device 7. In the example, the connection confirmation unit 320 confirms the connection state of the network 8 and, if the network 8 is offline, the connection confirmation unit 320 notifies the information selection unit 340 that the user terminal 3 and the manual management device 7 cannot communicate with each other. If the network 8 is online, the connection confirmation unit 320 notifies the transmission unit 400 that the user terminal 3 and the manual management device 7 can communicate with each other.

If the user terminal 3 and the manual management device 7 cannot communicate with each other, the information selection unit 340 selects the FAQ menu 114, which indicates some of manual information, based on the device information collected by the collection unit 300.

Specifically, if notified by the connection confirmation unit 320 that the network between the user terminal 3 and the manual management device 7 is yet to be connected, the information selection unit 340 performs pre-processing on the operation history, the device history, and the error log collected by the collection unit 300. And, based on those pre-processed operation history, device history, and error log, the information selection unit 340 selects FAQ menus 114 belonging to the display menu categories 112A to 112D from the manual storage DB200.

In the example, if notified by the connection confirmation unit 320 that the network 8 is offline, the information selection unit 340 selects, from the manual storage DB200, four FAQ menus 114 belonging to each of the display menu categories 112A to 112D in accordance with extraction conditions based on information correlated to a type and use status of the OS and an application or an error message and frequency, which are specific keywords contained in the device information. The extraction conditions are predetermined conditions to select the FAQ menus 114 and held in the information selection unit 340.

The following will describe one example of the FAQ menu 114 to be selected based on the keywords contained in the device information.

FIG. 7 is an example of the FAQ menu 114 selected based on the keywords (example of pre-processing by the information selection unit 340).

As illustrated in FIG. 7 the information selection unit 340 performs predetermined keyword research on the collected operation history, device history, and error log and, based on results of the search, converts the collected device information (operation history, device history, and error log) into device information that satisfies the extraction conditions.

For example, the information selection unit 340 searches for device information by using specific keywords of "OS" and "Windows (registered trademark)" and, if there is a hit, outputs the device information "OS: Windows (registered trademark)" as results of the pre-processing. The information selection unit 340 selects an FAQ menu 114 that is related to "OS: Windows (registered trademark)" from among manual data.

Further, similarly, the information selection unit 340 performs keyword search by using "language" and "Japanese" and, if there is a hit, outputs device information "language: Japanese" as results of the pre-processing. The information selection unit 340 selects an FAQ menu 114 that is related to "language: Japanese" from among the manual data.

As other example of keyword search, the information selection unit 340 performs search by using "application" as a keyword to determine the type and use situation of an application and, if there is a hit, appropriately extracts character strings following "application" and outputs "application: business card filing, business card, 300 dpi, color, 150 sheets/day" or "saved in mobile, A5, 150 dpi, monochromatic, 100 sheets/day".

Further, the information selection unit 340 performs search by using "error message and frequency" as a keyword and, if there is a hit, outputs a character string (for example, "manuscript jammed") following the error message and a character string (for example, "10" times/day) following the frequency.

The information selection unit 340 selects an FAQ menu 114 based on the extracted keyword research results. The results of selection may be, for example, "want to read/register only by pressing buttons" or "want to link up with Evernote" appearing on the want-to-do menu, as illustrated in FIG. 7B.

The updating unit 360 updates the manual display screen 11 on which the manual information is displayed, by using the FAQ menu 114 selected by the information selection unit 340.

Specifically, the updating unit 360 displays the FAQ menu 114 selected by the information selection unit 340 on the manual display screen 11. Moreover, if the user selects the FAQ menu 114 displayed on the manual display screen 11, the updating unit 360 notifies the displaying unit 380 of the updated manual display screen 11, commanding it to display manual information corresponding to the FAQ menu 114.

In the example, the updating unit 360 updates the front page configuration file in a manner that the FAQ menu 114 selected by the information selection unit 340 may belong to any one of the display menu categories 112A to 112D. Moreover, the updating unit 360 extracts information of answers to FAQ data corresponding to the FAQ menu 114 selected by the information selection unit 340 or information of instructions for use of the manual data, from the manual storage DB200. If the FAQ menu 114 on the manual display screen 11 is selected by the user, the updating unit 360 updates the front page configuration file in a manner that the information corresponding to the FAQ menu 114 selected by the user may be displayed. The updating unit 360 notifies the displaying unit 380 of the updated front page configuration file.

The displaying unit 380 displays the manual display screen 11 on the user terminal 3.

Specifically, the displaying unit 380 displays the manual display screen 11 on the user terminal 3 based on the front page configuration file posted by the updating unit 360.

The transmission unit 400 transmits the device information of the user terminal 3 or the scanner collected by the collection unit 300 to the manual management device 7.

Specifically, if notified by the connection confirmation unit 320 that the network 8 is offline, the transmission unit 400 acquires the device information from the manual storage DB200 and transmits it to the manual management device 7.

The reception unit 420 receives the FAQ menu 114 selected by the manual management device 7 and posts it to the updating unit 360. Further, the reception unit 420 receives the updated manual transmitted from the manual management device 7 and posts it to the difference application unit 440.

The difference application unit 440 stores the updated manual received from the reception unit 420 in the manual storage DB200 and updates the manual data.

Figure 8:
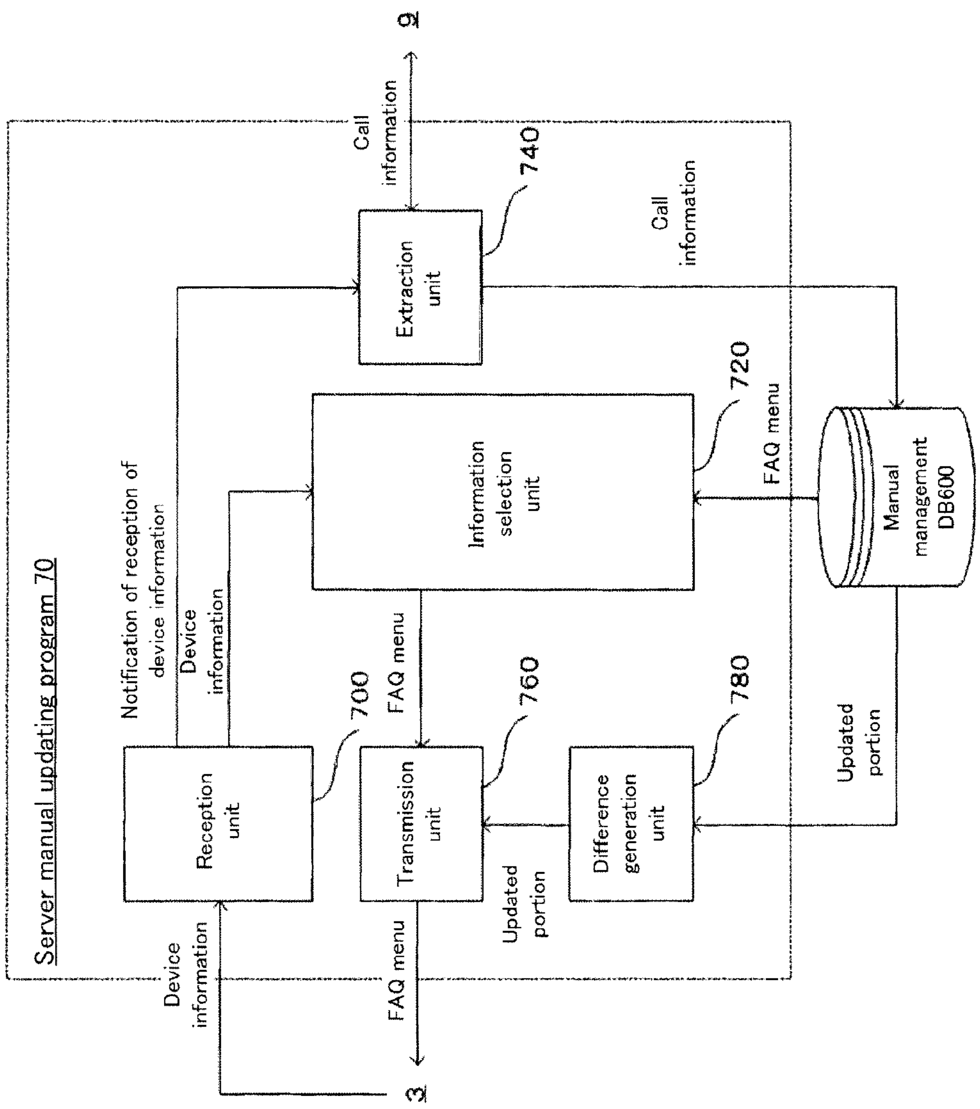
FIG. 8 is an explanatory diagram of a functional configuration of a server manual updating program 70 of the manual updating system 1.

FIG. 8 is an explanatory diagram of the functional configuration of a server manual updating program 70 of the manual updating system 1.

As illustrated in FIG. 8, the server manual updating program 70 has a reception unit 700, an information selection unit 720, an extraction unit 740, a transmission unit 760, and a difference generation unit 780. The server manual updating program 70 is installed to the manual management device 7 via a recording medium such as a CD-ROM, for example.

The reception unit 700 receives device information of the user terminal 3 transmitted by the transmission unit 400 in the user terminal 3 or device information of a peripheral connected to the scanner.

If the user terminal 3 and the manual management device 7 can communicate with each other, the information selection unit 720 selects an FAQ menu 114 to be displayed, based on the device information of the user terminal 3 or the scanner and call information extracted by the extraction unit 740 (to be described later).

Specifically, if the network 8 is online, the information selection unit 720 selects the FAQ menu 114 from the manual management DB600 based on the device information received by the reception unit 700.

In the example, the information selection unit 720 has the same functions as the information selection unit 340 in the user terminal 3. If having received the device information transmitted from the user terminal 3 by using the reception unit 700, the information selection unit 720 selects the FAQ menus 114 belonging to the display menu categories 112A to 112D from the manual management DB600 based on the information correlated with the type and the use situation of the OS and application or the error message and the frequency which are contained in the device information. Moreover, the information selection unit 720 weights the selected FAQ menus 114 by using the call information extracted by the extraction unit 740 (to be described later) and selects FAQ menus 114 belonging to the display menu categories 112A to 112D from the manual management DB600 in accordance with the extraction conditions. The information selection unit 720 posts the selected FAQ menus 114 to the transmission unit 760.

The extraction unit 740 extracts call information from the call information management device 9, which manages questions from customers.

Specifically, the extraction unit 740 extracts a call volume and a helpful answer volume which correspond to the FAQ menus 114 selected by the information selection unit 720 based on the device information from the call information management device 9. Moreover, the extraction unit 740 notifies the information selection unit 720 of the call information extracted from the call information management device 9.

The transmission unit 760 transmits difference information generated by the difference generation unit 780 to the user terminal 3.

Moreover, the transmission unit 760 transmits the selected FAQ menus 114 to the user terminal 3 based on the call information from the information selection unit 720.

The difference generation unit 780 generates an updated portion of the manual data as difference information.

Specifically, the difference generation unit 780 generates difference information from newly created manual data or revised manual data to be registered in the manual management DB600 and transmits it to the user terminal 3.

In the example, the difference generation unit 780 transmits only the newly created manual data file or the revised manual data file whichever is more recent in version to the user terminal 3 as the difference information.

FIGS. 9A and 9B are one example of the FAQ menu 114 that corresponds to device information.

FIGS. 9A and 9B illustrate some of the FAQ menus 114 contained in the vast amounts of manual data, showing the FAQ menus 114 corresponding to application operation history information, device history information, error log information 1, and error log information 2 in this case.

FIG. 10 is one example of conditions for extracting the FAQ menu 114.

FIG. 10 illustrates extraction conditions which are employed when the information selection unit 340 and the information selection unit 720 select the FAQ menus 114.

The extraction conditions 1 through 4 are employed to select the FAQ menus 114 in specified priority order of the FAQ menus 114. Accordingly, a default FAQ menu to be displayed is determined.

An extraction condition 5 is employed to extract the FAQ menus 114 according to an application operating frequency. The information selection unit 340 and the information selection unit 720 employ the extraction condition 5 when they select the FAQ menus 114 at a frequency at which the user operates an application. Accordingly, it is possible to provide information about application software frequently used by the user. It is also possible to propose utilization of application software not frequently utilized by the user.

An extraction condition 6 is employed to extract the FAQ menus 114 according to a device operating frequency. The information selection unit 340 and the information selection unit 720 employ the extraction condition 6 when they select the FAQ menus 114 at a frequency at which the user operates a device. Accordingly, it is possible to make a proposal that matches the way of user's operations. For example, shortcut operations can be proposed.

That is, if one of two ways of selecting the FAQ menus 114 under the respective extraction conditions 5 and 6 whichever is higher in operation frequency is employed, it is possible to select the FAQ menus 114 frequently used by the user. Further, if one of the two ways of selecting the FAQ menus 114 whichever is lower in operation frequency is employed, it is possible to select the FAQ menu 114 that makes a proposal to the user to employ a new method to use the device.

Extraction conditions 7 and 8 are employed to extract the FAQ menus 114 according to a frequency of errors occurring on a device. The information selection unit 340 and the information selection unit 720 employ the extraction condition 8 when they select the FAQ menus 114 according to the frequency at which errors occurred on the device. Accordingly, it is possible to make a proposal for an error handling method.

That is, by selecting the FAQ menus 114 under the extraction condition 7 or 8, it is possible to select the FAQ menu 114 which is highly likely to be selected and operated by the user.

An extraction condition 9 is employed to extract the FAQ menus 114 according to weighting by use of a call total. The information selection unit 720 employs the extraction condition 9 when it calculates a call total from call information extracted by the extraction unit 740 and selects the FAQ menu 114 based on the calculated call total. Accordingly, it is possible to make a proposal taking into account a telephone inquiry volume and inquiry contents, thereby reducing the number of times of telephone inquiry, for example.

FIGS. 11A and 11B are an example of selecting the FAQ menu 114 when manual data is new or updated.

Priority order for the FAQ menus 114 is determined beforehand, so that the information selection unit 340 selects the FAQ menus 114 belonging to the display menu categories 112A to 112D (want-to-do category, want-to-check category, frequently-asked-question category, and proposal category) in the FAQ menu 114 priority order from among the manual data held in the manual storage DB200 or the FAQ menus 114 contained in the FAQ data.

In FIGS. 11A and 11B, according to the extraction conditions 1 to 4, the information selection unit 340 selects the FAQ menus 114 to be displayed on the manual display screen 11 from a list of those FAQ menus 114 that correspond to the application operation history information, the device history information, the error log information 1, and the error log information 2, which are the device information.

FIG. 11A has an example (A) of the selected FAQ menu 114 that corresponds to the application operation history information. The information selection unit 340 selects the FAQ menus 114 according to the priority order and the extraction condition 1 from among those FAQ menus 114 that are related to "office functions" corresponding to the application operation history information, which is the device information. For example, the information selection unit 340 selects two high-priority categories of "save in specified folder" and "add to mail" as the display menu category 112A of "want-to-do".

FIG. 11A has an example (B) of the selected FAQ menu 114 that corresponds to the device history information.

The information selection unit 340 selects the FAQ menus 114 according to the priority order and the extraction condition 2 from among those FAQ menus 114 that are related to "various ways to use" corresponding to the device history information, which is the device information. For example, the information selection unit 340 selects two high-priority categories of "read only single side" and "read color manuscript in gray or black-and-white" as the display menu category 112A of "want-to-do" corresponding to the device history information.

FIG. 11B has an example (C) of the selected FAQ menu 114 that corresponds to the error log information 1.

The information selection unit 340 selects the FAQ menus 114 according to the priority order and the extraction condition 3 from among those FAQ menus 114 that are related to "manuscript reading" and "how to use Manager" corresponding to the error log information 1, which is the device information. For example, the information selection unit 340 selects one high-priority category of "manuscript reading not started" as the display menu category 112C "frequently-asked-question".

FIG. 11B has an example (D) of the selected FAQ menu 114 that corresponds to the error log information 2.

The information selection unit 340 selects the FAQ menus 114 according to the priority order and the extraction condition 4 from among those FAQ menus 114 that are related to "A3 carrier sheet" and "image data creation" corresponding to the error log information 2, which is the device information. For example, the information selection unit 340 selects one high-priority category of "A3 carrier sheet not sent properly" as the display menu category 112C of "frequently-asked-question".

As results of the selection, the FAQ menu 114 with a white circle is given. Since the FAQ menus 114 are assigned priorities, the FAQ menus 114 can be selected even if no device information is available.

FIGS. 12 to 15 are examples of the FAQ menu 114 selected before weighting (in offline status).

In this case, the information selection unit 340 or the information selection unit 720 selects the FAQ menus 114 based on the extraction conditions and the device information collected by the collection unit 300 (a daily number of times of using a quick menu, which is a read application history, a daily number of times of changing settings, which is a function use history, and a daily number of times of device error occurrence, which is an error history).

FIG. 12 is an example of the FAQ menu 114 selected based on application operation history information.

First, the information selection unit 340 or the information selection unit 720 outputs the number of times of using the quick menu, which is the daily read application history, contained in the device information collected by the collection unit 300. An FAQ menu 114 is selected based on the output number of times of using the quick menu as a candidate for the FAQ menu 114 to be displayed on the manual display screen 11.

For example, the information selection unit 340 or the information selection unit 720 selects three high-priority categories having a large number of times of using the quick menu of "save in specified folder", "register business card information in CardMinder", and "register in iPhoto" as the display menu category 112A of "want-to-do" based on the extraction condition 5A.

Further, alternatively, the information selection unit 720 narrows down the FAQ menus 114 selected based on the extraction condition 5A and to be displayed on the manual display screen 11, according to the extraction conditions 5B.

For example, as the display menu category 112A of "want-to-do", the information selection unit 340 or the information selection unit 720 selects two high-priority categories with the large number of times of using the quick menu of "save in specified folder" and "register business card information in CardMinder" from among those FAQ menus 114 that are selected based on the extraction condition 5A.

FIG. 13 is an example of the FAQ menu 114 selected based on device history information.

The information selection unit 340 or the information selection unit 720 outputs the daily number of times of changing settings, which is the daily number of times using functions, contained in the device information collected by the collection unit 300. An FAQ menu 114 is selected based on the output number of times of using the settings as a candidate for the FAQ menu 114 to be displayed on the manual display screen 11. For example, as the display menu category 112A of "want-to-do", the information selection unit 340 or the information selection unit 720 selects three high-priority categories having a large number of times of changing the settings of "read only single side", "correct various directions in which manuscript is read", and "read long manuscript" based on the extraction condition 6A.

Further, the information selection unit 340 or the information selection unit 720 narrows down the FAQ menus 114 selected based on the extraction condition 6A and to be displayed on the manual display screen 11, according to the extraction conditions 6B. For example, as the display menu category 112A of "want-to-do", the information selection unit 340 or the information selection unit 720 selects two high-priority categories with the large number of times of changing the settings of "read only single side" and "correct various directions in which manuscript is read" from among those FAQ menus 114 that are selected based on the extraction condition 6A.

FIG. 14 is an example of the FAQ menu 114 selected based on error log information 1.

The information selection unit 340 or the information selection unit 720 outputs the daily number of times of device error occurrence contained in the device information collected by the collection unit 300. An FAQ menu 114 is selected based on the output number of times of error occurrence as a candidate for the FAQ menu 114 to be displayed on the manual display screen 11. For example, as the display menu category 112C of "frequently-asked-question", the information selection unit 340 or the information selection unit 720 selects "manuscript not sent properly/manuscript jammed" and "multiple manuscripts sent at a time" having the number of times of error occurrence of not 0, based on the extraction condition 7A.

Further, the information selection unit 340 or the information selection unit 720 narrows down the FAQ menus 114 selected based on the extraction condition 7A and to be displayed on the manual display screen 11, according to the extraction conditions 7B. For example, as the display menu category 112C "frequently-asked-question", the information selection unit 340 or the information selection unit 720 selects one high-priority category having the large number of error occurrence of "manuscript not sent properly/manuscript jammed" in the FAQ menu 114 selected based on the extraction condition 7A.

FIG. 15 is an example of the FAQ menu 114 selected based on error log information 2.

The information selection unit 340 or the information selection unit 720 outputs the daily number of times of device error occurrence contained in the device information collected by the collection unit 300. An FAQ menu 114 is selected based on the output number of times of error occurrence as a candidate for the FAQ menu 114 to be displayed on the manual display screen 11. For example, as the display menu category 112C "frequently-asked-question", the information selection unit 340 or the information selection unit 720 selects categories having the number of error occurrence not being 0 of "image data lacking (A3 carrier sheet)" and "image data tilted" based on the extraction condition 8A.

Further, the information selection unit 340 or the information selection unit 720 narrows down the FAQ menus 114 selected based on the extraction condition 8A and to be displayed on the manual display screen 11, according to the extraction conditions 8B. For example, as the display menu category 112C of "frequently-asked-question", the information selection unit 340 or the information selection unit 720 selects one high-priority category having the large number of error occurrence of "image data lacking (A3 carrier sheet)" from among the FAQ menus 114 selected based on the extraction condition 8A.

FIGS. 16A and 16B are an example of the FAQ menu 114 selected after weighting.

If the network 8 over which the user terminal 3 and the manual management device 7 are connected to each other is online, the extraction unit 740 extracts a call volume and a helpful answer volume which correspond to the FAQ menu 114 selected by the information selection unit 720 from the call information management device 9 based on the extraction conditions 5A to 8A shown in FIGS. 12 to 15. The information selection unit 720 calculates a call total from the extracted call information.

For example, in the display menu category 112A of "want-to-do", the extraction unit 740 extracts the call volume and the helpful answer volume which correspond to "save in specified folder", "register business card information in CardMinder", "register in iPhoto", "read only single side", "correct various directions of manuscript in which manuscript is read", and "read long manuscript" from the call information management device 9. In one example, the call total becomes "28" because the call volume and the helpful answer volume corresponding to "save in specified folder" is "23" and "5" respectively.

The information selection unit 720 weights the FAQ menus 114 selected based on the extraction conditions 5A to 8A shown in FIGS. 12 to 15 by using the call total and selects top four FAQ menus 114 having the large call total again according to the extraction condition 9. For example, as the display menu category 112A of "want-to-do", the information selection unit 720 selects "save in specified folder", "register business card information in CardMinder", "correct various directions of manuscript in which manuscript is read", and "read long manuscript".

In comparison to the FAQ menus 114 selected based on the device information shown in FIGS. 12 to 15, in the display menu category 112A of "want-to-do", "read only single side" selected based on the device information drops off from results of the selection taking into account the call information, whereas "read long manuscript" provides the selection results. In such a manner, the selection results differ if the call information is taken into account.

Therefore, since the information selection unit 720 selects the FAQ menus 114 based on the number of times of inquiries by the user, it is possible to select the FAQ menus 114 having a higher frequency of use by the user. Further, a manual having an item asked frequently by the user can be referenced easily, resultantly decreasing the number of times of inquiries by the user and reducing costs of a call center.

Figure 17:
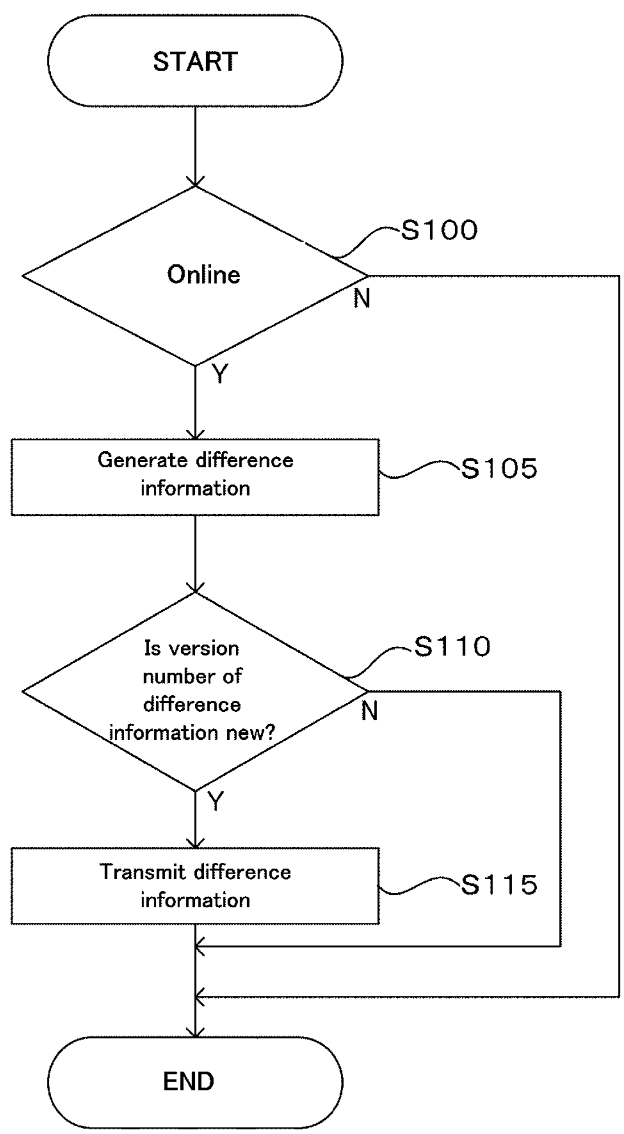
FIG. 17 is an explanatory flowchart of manual data updating processing (S10)

FIG. 17 is an explanatory flowchart of manual data updating processing (S10).

As illustrated in FIG. 17, in step 100 (S100), the connection confirmation unit 320 checks the connection state of a network with the user terminal 3 and the manual management device 7. If the network 8 is online, the manual data updating processing (S10) shifts to S105. If the network 8 is offline, the manual data updating processing (S10) ends.

In step 105 (S105), the difference generation unit 780 extracts an updated manual from the manual management DB600 as a candidate for difference information.

In step 110 (S110), the difference generation unit 780 confirms the version number of the updated manual, which is the candidate for the difference information. If the version number is new, the difference generation unit 780 creates difference information and posts it to the transmission unit 760. Then, the manual data updating processing (S10) shifts to S115.

If the version number is not new, the difference generation unit 780 does not set the difference information as the candidate and ends the manual data updating processing (S10).

In step 115 (S115), the transmission unit 760 transmits the difference information posted from the difference generation unit 780, to the user terminal 3.

Figure 18:
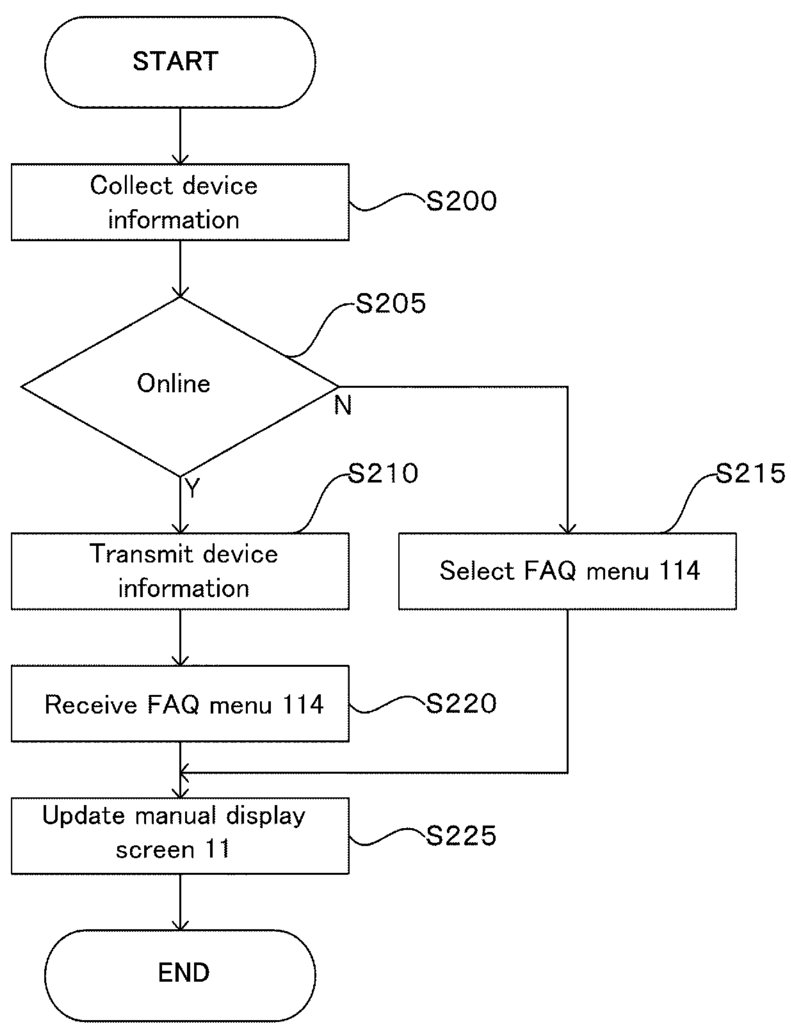
FIG. 18 is an explanatory flowchart of front page updating processing (S20)

FIG. 18 is an explanatory flowchart of front page updating processing (S20).

As illustrated in FIG. 18, in step 200 (S200), the collection unit 300 collects device information of the user terminal 3 or the scanner and stores it in the manual storage DB200.

In step 205 (S205), the connection confirmation unit 320 checks whether the user terminal 3 and the manual management device 7 are connected to each other over the network. If the network 8 is online, the front page updating processing (S20) shifts to S210, and if the network 8 is offline, the front page updating processing (S20) shifts to S215.

In step 210 (S210), the transmission unit 400 extracts the device information from the manual storage DB200 and transmits it to the manual management device 7.

In step 215 (S215), the information selection unit 340 selects an FAQ menu 114 from the manual storage DB200 based on the device information collected by the collection unit 300.

In step 220 (S220), the reception unit 420 receives the FAQ menu 114 selected by the selection unit 720 and transmitted from the manual management device 7.

In step 225 (S225), the updating unit 360 updates a front page configuration file based on the FAQ menu 114 received by the reception unit 420, so that the displaying unit 380 displays the manual display screen 11 based on the updated front page configuration file.

Figure 19:
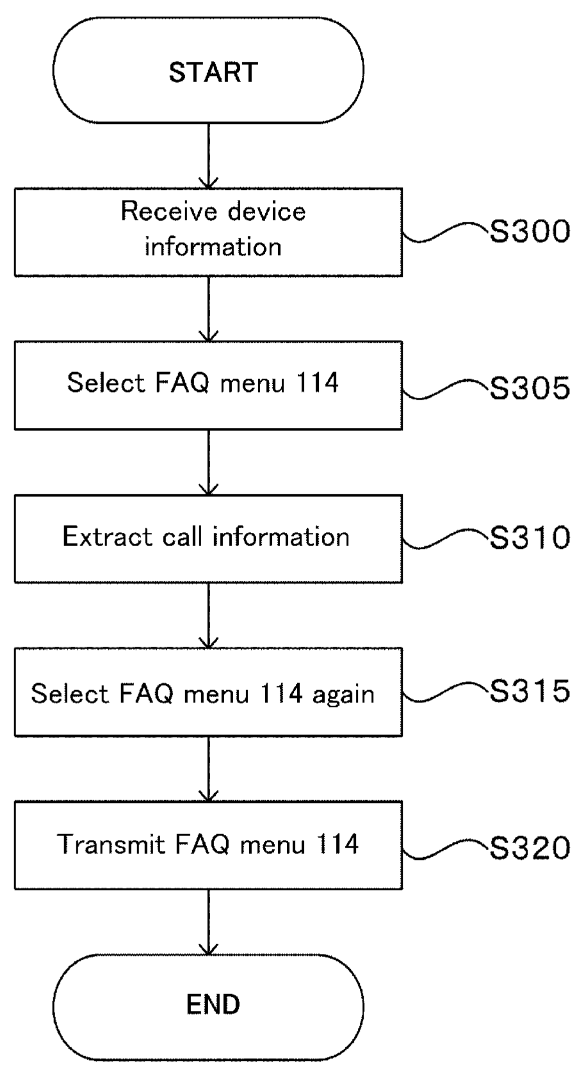
FIG. 19 is an explanatory flowchart of manual updating processing (S30) by a manual management device 7 in online status.

FIG. 19 shows manual updating processing (S30) by the manual management device 7 in online status.

As illustrated in FIG. 19, in step 300 (S300), the reception unit 700 receives device information transmitted from the user terminal 3.

In step 305 (S305), the information selection unit 720 selects an FAQ menu 114 from the manual management DB600 based on the device information received by the reception unit 700.

In step 310 (S310), the extraction unit 740 extracts call information corresponding to the FAQ menu 114 selected by the information selection unit 720 from the call information management device 9.

In step 315 (S315), the information selection unit 720 weights the FAQ menu 114 selected in S305 by using a call total based on the call information extracted by the extraction unit 740 and selects an FAQ menu 114 again and posts it to the transmission unit 760.

In step 320 (S320), the transmission unit 760 transmits the FAQ menu 114 selected by the information selection unit 720 and transmits it to the user terminal 3.

As hereinabove described, the manual updating system 1 of the embodiment includes the user terminal 3 which stores manual information and browses manuals and the manual management device 7 which manages the manuals. The user terminal 3 selects FAQ menus 114 from the manual storage DB200 based on device information of the user terminal 3 or peripheral 5 of the user terminal 3. Based on the selected FAQ menu 114, the user terminal 3 updates the manual display screen 11 on which manuals are browsed, in a manner that this selected FAQ menu 114 may be displayed on this manual display screen 11. Further, the user terminal 3 updates the manual display screen 11 in a manner that a manual corresponding to one of the FAQ menus 114 which is selected by the user on the manual display screen 11 can be displayed on it.

If the user terminal 3 and the manual management device 7 can communicate data to each other, the user terminal 3 transmits the collected device information to the manual management device 7. The manual management device 7 selects an FAQ menu 114 from the manual management DB600 based on the device information and, further, extracts call information relating to the selected FAQ menu 114 from the call information management device 9. The manual management device 7 selects an FAQ menu 114 again based on the extracted call information. The manual management device 7 transmits the selected FAQ menu 114 to the user terminal 3, while the user terminal 3 updates the manual display screen 11 based on the received FAQ menu 114.

Therefore, the user terminal 3 selects a user-friendly FAQ menu 114 corresponding to device information, that is, a past record of use by the user and creates the manual display screen 11. Consequently, it is possible to dynamically create the user-friendly manual display screen 11 and immediately provide the manual display screen 11 that matches user's applications with minimum required information, thereby promoting utilization of the manual information.

Further, when the manual updating system 1 is in the online status, the manual management device 7 selects an FAQ menu 114 based on device information and call information, while the user terminal 3 creates the manual display screen 11, so that the possibility of the FAQ menu 114 selected by the information selection unit 720 matching user's applications improves further, thereby enabling promoting the utilization of the manuals.

Moreover, as shown in FIG. 6, contents of the manuals held locally are enormous in quantity, so that the user cannot easily find his/her desired information. However, the manual browsing device according to the embodiment can provide even information about user's potential needs that he/she himself/herself does not recognize.

Next, a description will be given of a variant of the embodiment described above.

Although in the embodiment the call information management device 9 has been independent of the manual management device 7, the invention is not limited to it; the functions of the call information management device 9 may be assigned to the manual management device 7.

Further, although in the embodiment the collection unit 300 has collected device information when the updating button had been pressed by the user, the invention is not limited to it; the collection unit 300 may always collect the device information.

Moreover, although FAQ menus have been posted, selected, and transmitted between the components in FIGS. 5 and 7, the invention is not limited to it; for example, FAQ menu IDs may be posted, selected, and transmitted in order to identify FAQ menus correlated to the FAQ menus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:

a manual browsing device; and a manual management device, wherein:

the manual browsing device includes:

a non-transitory manual storage which stores manual information, a collection section which collects an operation history, a device history, and an error log of the manual browsing device from the manual browsing device or an operation history, a device history, and an error log of a peripheral from the peripheral, which is an external device communicating information with the manual browsing device, and an updating section which updates a display screen on which the manual information is displayed, the manual management device includes an information selection section which selects a display menu indicating some of the manual information based on the operation history, the device history, and the error log collected by the collection section, the updating section updates the display screen by using the display menu selected by the information selection section, the collection section collects:

the operation history which is a history of user operations on the manual browsing device or the operation history of the peripheral;

the device history which is information of an inside of a device in the manual browsing device which is not erroneous or the device history of the peripheral; and the error log which is a history of errors occurring on the manual browsing device or the error log of the peripheral as the device information, the information selection section selects the display menu indicating some of the manual information based on the operation history, the device history, and the error log collected by the collection section, the operation history is a history of operations of application software, and the device history is information of an operating system (OS) in hardware or information of settings of the OS or the peripheral.

2. The information processing system according to claim 1, wherein:

the manual management device further includes an extraction section which extracts inquiry information from a customer, and the information selection section selects the display menu indicating some of the manual information based on the device information collected by the collection section and the inquiry information extracted by the extraction section.

3. The information processing system according to claim 2, wherein:

the manual browsing device further includes an information selection section which selects the display menu indicating some of the manual information based on the device information collected by the collection section, if the manual browsing device and the manual management device are configured to communicate to each other, the information selection section in the manual management device selects the display menu indicating some of the manual information, and if the manual browsing device and the manual management device are not be configured to communicate to each other, the information selection section in the manual browsing device selects the display menu indicating some of the manual information.

4. The information processing system according to claim 1, wherein:

the manual management device further includes:

a difference information generation section which generates an updated portion of the manual information as difference information; and a transmission section which transmits the difference information generated by the difference information generation section to the manual browsing device, and the manual browsing device further includes a difference application section which updates the manual information based on the difference information transmitted from the transmission section.

5. A manual browsing device comprising:

a non-transitory manual storage that stores manual information;

a collection section that collects an operation history, a device history, and an error log of the manual browsing device from the manual browsing device or an operation history, a device history, and an error log of a peripheral from the peripheral, which is an external device communicating information with the manual browsing device;

an information selection section that selects a display menu which indicates some of the manual information based on the operation history, the device history, and the error log collected by the collection section; and an updating section that updates a display screen on which the manual information is displayed, by using the display menu selected by the information selection section, wherein:

the collection section collects:

the operation history which is a history of user operations on the manual browsing device or the operation history of the peripheral;

the device history which is information of an inside of a device in the manual browsing device which is not erroneous or the device history of the peripheral; and the error log which is a history of errors occurring on the manual browsing device or the error log of the peripheral as the device information, the information selection section selects the display menu indicating some of the manual information based on the operation history, the device history, and the error log collected by the collection section, the operation history is a history of operations of application software, and the device history is information of an operating system (OS) in hardware or information of settings of the OS or the peripheral.

6. A non-transitory computer-readable medium storing thereon a computer program that, when executed by a computer, causes the computer to perform a method comprising:

collecting an operation history, a device history, and an error log of a manual browsing device from the manual browsing device or an operation history, a device history, and an error log of a peripheral from the peripheral, which is an external device communicating information with the manual browsing device;

selecting a display menu which indicates some of the manual information based on the operation history, the device history, and the error log collected by the manual browsing device; and updating a display screen on which the manual information is displayed by using the display menu selected by the manual browsing device, in the collecting, the operation history which is a history of user operations on the manual browsing device or the operation history of the peripheral; the device history which is information of an inside of a device in the manual browsing device which is not erroneous or the device history of the peripheral; and the error log which is a history of errors occurring on the manual browsing device or the error log of the peripheral as the device information are collected, in the selecting, the display menu indicating some of the manual information is selected based on the operation history, the device history, and the error log collected by the collection section, the operation history is a history of operations of application software, and the device history is information of an operating system (OS) in hardware or information of settings of the OS or the peripheral.

* * * * *